No. 745,337. Patented December 1, 1903.

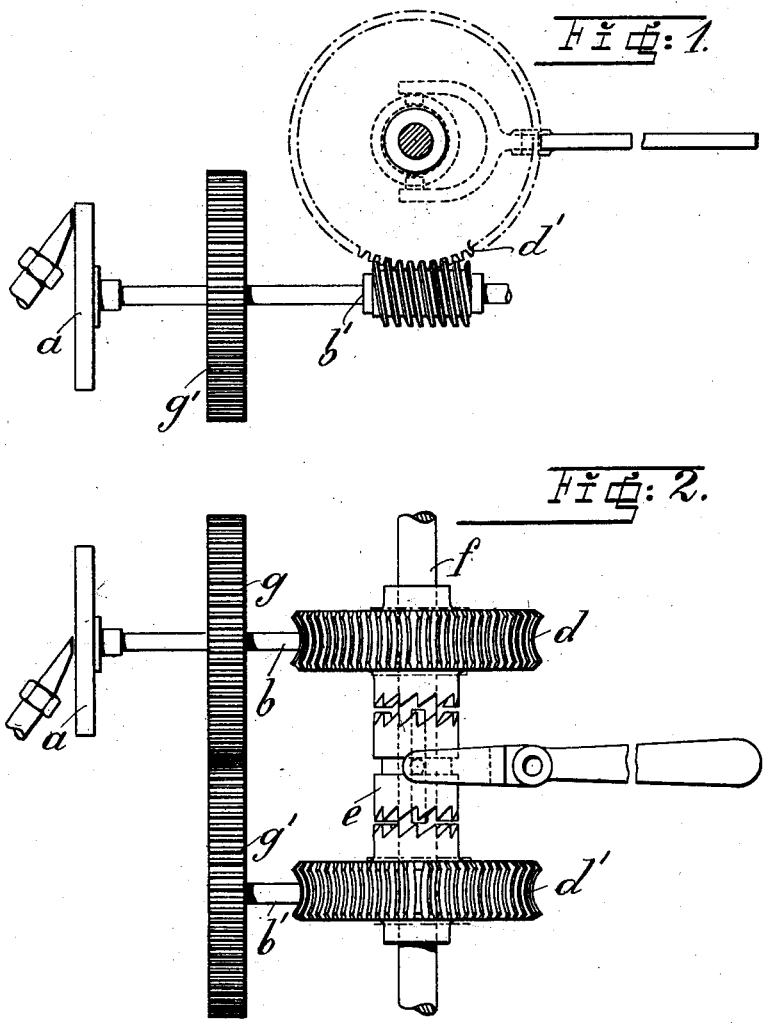

UNITED STATES PATENT OFFICE.

ERNST ELIS FRIDOLF FAGERSTRÖM, OF SUNDBYBERG, SWEDEN.

REVERSING-GEAR.

SPECIFICATION forming part of Letters Patent No. 745,337, dated December 1, 1903.

Application filed April 1, 1903. Serial No. 150,593. (No model.)

*To all whom it may concern:*

Be it known that I, ERNST ELIS FRIDOLF FAGERSTRÖM, a subject of the King of Sweden and Norway, and a resident of Sundbyberg, in the county of Upland, in the Kingdom of Sweden, have invented certain new and useful Improvements in Reversing-Gears, of which the following is a specification.

The present invention relates to a device for reversing the direction of rotation of a shaft driven by a steam-turbine or other motor. In the accompanying drawings such a device is illustrated as applied to a steam-turbine and suitable for use in boats, &c.

Figure 1 represents an elevation, and Fig. 2 a plan view.

The steam-turbine wheel or motor $a$, which always revolves in the same direction, has a portion of its shaft $b$ threaded and gearing with a worm-gear $d$, loosely mounted on the shaft $f$ to be driven. The turbine or motor shaft, moreover, carries a gear $g$, a friction-wheel, or the like gearing with a similar gear or wheel $g'$, on another likewise-threaded shaft, $b'$, parallel to the shaft $b$ and driving in the opposite direction to the former, $d$, another worm-gear, $d'$, loosely mounted on the shaft $f$. This shaft $f$ besides carries one or two couplings $e$, by means of which one or the other of the gears $d\ d'$ can be connected with the shaft $f$, thus causing said shaft to revolve in one direction or the other. When the coupling-lever is in its middle position, Fig. 2, the coupling is disconnected from the two gears, which will then revolve freely on the shaft $f$ without imparting any motion to it.

Having now particularly described and ascertained the nature of my said invention and in what manner the same is to be performed, I declare that what I claim is—

In an improved reversing device for rotating shafts the combination with the shafts $b$, $b'$ and $f$ of two worm-gears $d$, $d'$ loosely mounted on the shaft $f$, a coupling device for connecting either of the said worm-gears with the shaft and two worms or screws gearing with the worm-gears and being each arranged on or connected to either of two shafts $b$, $b'$ gearing with each other the one of said shafts obtaining its motion from a motor.

In witness whereof I have hereunto set my hand in presence of two witnesses.

ERNST ELIS FRIDOLF FAGERSTRÖM.

Witnesses:
 H. TELANDER,
 T. RISBERG.